No. 745,687. PATENTED DEC. 1, 1903.
H. M. SUTTON, W. L. STEELE & M. COERVER.
METHOD OF BALANCING RELAYS.
APPLICATION FILED AUG. 15, 1902.
NO MODEL.
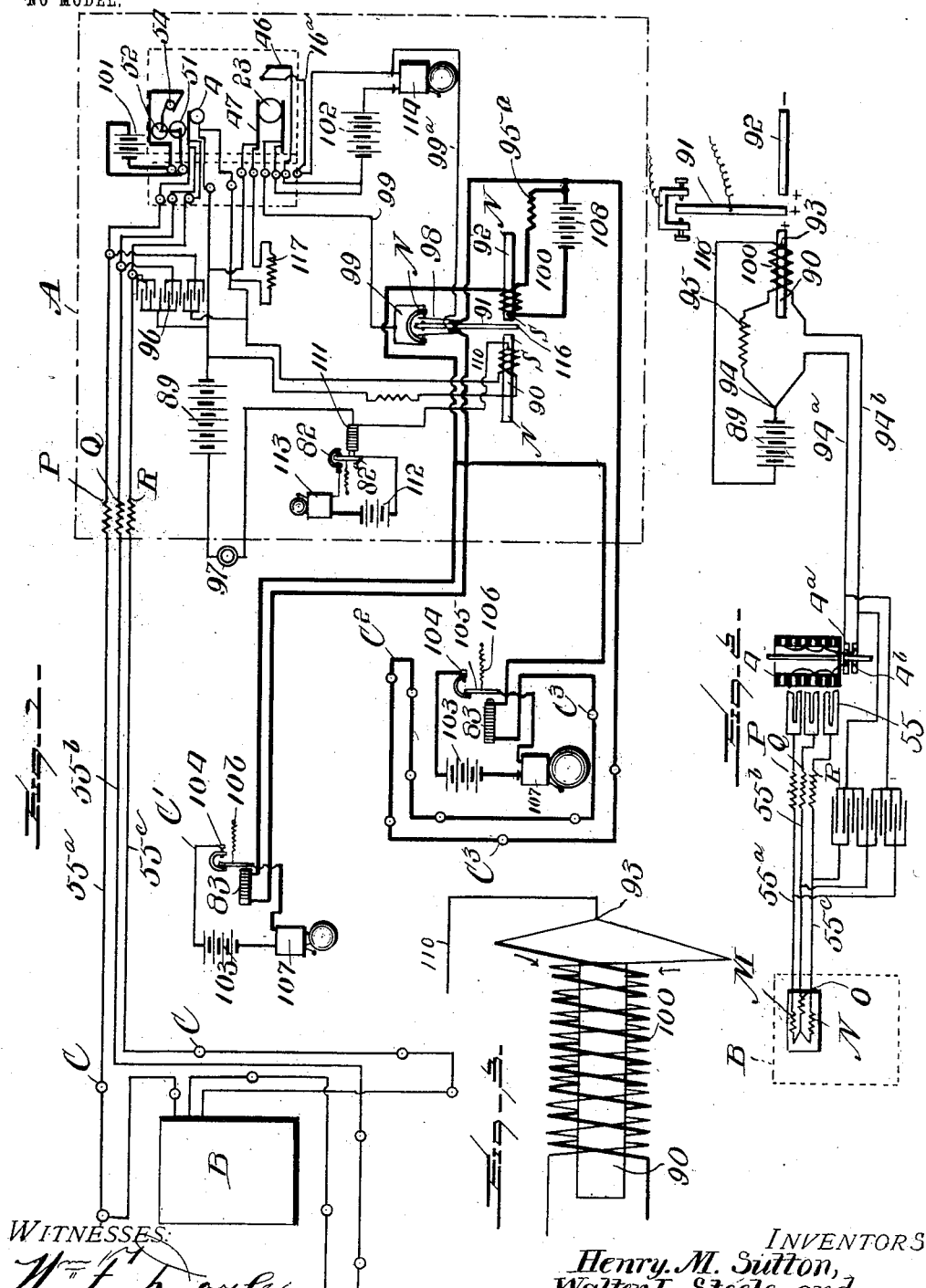
WITNESSES:
Wm F Doyle
Alfred T. Gage
INVENTORS
Henry M. Sutton,
Walter L Steele, and
Michael Coerver
By E B Stocking Attorney No. 745,687. Patented December 1, 1903.

UNITED STATES PATENT OFFICE.

HENRY M. SUTTON, WALTER L. STEELE, AND MICHAEL COERVER, OF DALLAS, TEXAS.

METHOD OF BALANCING RELAYS.

SPECIFICATION forming part of Letters Patent No. 745,687, dated December 1, 1903.

Application filed August 15, 1902. Serial No. 119,801. (No model.)

*To all whom it may concern:*

Be it known that we, HENRY M. SUTTON, WALTER L. STEELE, and MICHAEL COERVER, citizens of the United States, residing at Dallas, in the county of Dallas, State of Texas, have invented certain new and useful Improvements in Methods of Balancing Relays, of which the following is a specification, reference being had therein to the accompanying drawings.

This invention relates to a method of balancing a relay for protecting electric circuits, and is herein illustrated as applied to an electric-alarm circuit, although applicable to any electric circuit.

The invention has for an object to balance a relay by dividing the current from a battery and connecting said divisions in reverse directions relative to a polarized core, whereby the variations of battery strength will not unbalance the relay nor affect the sensitiveness thereof. Under ordinary conditions, if the line-battery is not kept at an absolutely constant strength it will unbalance the relay and cause an alarm, while if the contacts of the relay are set sufficiently far apart to allow for variation of battery strength the sensitiveness thereof is destroyed. It is therefore necessary to provide the constant supervision of an attendant for the main battery in order that the sensitiveness of the armature may be at the degree for efficient service.

The object of this invention is to provide a method of winding to prevent the variations in battery strength from affecting the sensitive armature by so arranging the circuit that not a particle of the variation of the current strength in the main line and protected structure can occur without causing an alarm, while the whole system of circuits is absolutely independent of the strength of the main-line battery necessary for its maintenance.

Other objects and advantages of the invention will hereinafter appear in the following description, and the novel features thereof will be particularly pointed out in the appended claims.

In the drawings, Figure 1 is a diagrammatical view of the different parts of the electric-alarm system embodying this relay separated from each other to illustrate the circuit relations and connections. Fig. 2 is a similar view showing in enlarged detail a circuit-changer in relation to one side of the relay and a protected structure, and Fig. 3 is a diagrammatic view illustrating the winding of the relay-magnet.

Like characters of reference refer to like parts in the several figures of the drawings.

Referring to Fig. 1 of the drawings, it will be seen that the parts comprising the main or signal station are located within any desired form of protected cabinet—such, for instance, as is indicated by dotted lines at A— while the protected structure upon the line will be located as at B or any other desired point. Upon these lines at various points fire-signals—for instance, thermostats or circuit-closers—as indicated by circles at C may be used or as indicated by enlarged detail at $C'$ for a substation, or as at $C^2$ for a substation having a series of circuit-breakers or alarm devices, as indicated at $C^3$. The protected structures and substations are connected with the main station by means of main-line wires, any desired number of which may be used—for instance, three, such as $55^a$ $55^b$ $55^c$. (Shown in Figs. 1 and 2.) These wires communicate with the circuit-changer 4, which is shown more fully by diagram in Fig. 2, and are supplied with current from the main-line battery 89, as indicated. For the purpose of clearly understanding the application of the invention it may be assumed that the protected structure B is a bank, safe, or vault connected to the police-station A by the main-line wires, while the substations are supposed to be located at the houses of the various officials who may be interested in the protected premises, and they would then be notified of any interference at the protected banks, safes, or vaults simultaneously with the police-station A, the circuits to said substations being led from the police-station. One of the principal objects of this invention is to supply the circuits from this battery and balance one circuit against the other through the differential winding of the relay device, for instance, as illustrated in Figs. 1 and 2. In the latter figure the circuit from the main-line battery 89 is split or branched at the point 94, one circuit of which passes through a compensating resistance 95, and said circuit is wound upon a permanent magnet 90, as shown by the coil 100. The other branch of the circuit starting at the point 94 proceeds through one of the line-wires $94^a$ to the contact $4^a$ of the current-changer and shifting device 4, thence through any one of the line-wires $55^a$, $55^b$, or $55^c$ to the protected structure, from which it returns to the current-changer 4, thence through the contact $4^b$ to the return-line $94^b$, passing through the coil 100 in a reverse direction to the previous winding and connected to the circuit-wire 110 at the point 93. The circuit and connections shown in Fig. 2 are illustrated at the left of the armature 91 in Fig. 1 and a similar arrangement of parts is disposed at the right of said armature, each of the permanent magnets being disposed with their opposing poles facing each other, so that a mutually-repellent action is exerted upon the pivoted polarized armature, as will be hereinafter more fully described. It will be seen from this construction that if the protected structure and its connections have exactly the same resistance as the compensating resistance 95 the battery-currents flowing through the differentially-wound coils of the permanent magnet 90 will exactly neutralize each other, so that the value of the permanent magnet will in no wise be altered. It will also be seen that it will make no difference what the strength of the main-line battery will be, as the division of the circuit will also be even if the protected structure and that of the compensating resistance exactly balance each other. If for any cause whatever more or less resistance is thrown into the circuit of the protected structure, it will cause more current to flow through one winding of the coil 100 than the other, and thus alter the value of the permanent magnet 90 of the main relay 116. (Shown in Fig. 1.) The result of this is to alter the push or effect of the magnet upon the pivoted armature 91 and cause it to contact on either side as the strength of the permanent magnet 90 is made stronger or weaker by the greater or lesser amount of current flowing through any one winding of the coil 100.

By reference to Fig. 1 it will be seen that the permanent magnet 92 at the right of the pivoted polarized armature 91 is similarly wound with the coil 100 to the winding of the magnet 90 just described, and the circuits from this winding are provided with a compensating resistance $95^a$ and a battery 108, connecting with a circuit extending to protected structures or substations; but the winding of magnet 92 may be omitted and a permanent magnet used alone, as in Fig. 2. It will be observed that these permanent magnets are disposed with their opposite poles toward each other, whereby a mutually-repellant action is exerted upon the pivoted armature 91, so that each one is balanced against the other and operates the alarm-signal upon the unbalancing of either one of them. This structure also presents a material advantage over the ordinary form embodying poles of opposite polarity acting upon an armature whose action is either restrained by an opposing spring or another magnet, as in an ordinary relay. Under such conditions the attraction of the magnet very greatly increases as the distance between its armature and poles decreases, rendering a delicate and accurate adjustment practically impossible; but with the disposition of the poles herein disclosed the opposing action of the magnets exerts a common push on the polarized armature to a point of common equilibrium between the poles, and the position of this armature is determined by the relative strength of the permanent magnets. It will be apparent that the differential winding on these magnets does not influence the magnetism in the least degree unless more current is made to flow through one winding of the coil 100 than the other. As shown in Fig. 1, the upper end of the pivoted armature is adapted to contact in its oscillations with circuit connections from the line 99, to be more fully described hereinafter. The armature is provided upon opposite sides with spring-plates 98, insulated therefrom and normally in contact with the connections from line 99. When the armature is moved from its normal position, one of the springs is caused thereby to leave the contact with the line 99, and therefore opens the circuit and causes the local circuits to sound an alarm at each place. This armature of the relay is also in circuit by means of the line $99^a$ with an alarm 114, through which current may be directed over the line 99 by the contact of the upper end of the armature with the contact-plates 98, and for the purpose of energizing this alarm a suitable local battery 102 may be placed in the circuit, if desired.

The circuit-changer 4 is composed of a series of contact-rings insulated from each other, as shown in our Patent No. 722,334, March 10, 1903, the alternate rings being connected by conducting-wires with the contacts $4^a$ and $4^b$, as shown in Fig. 2. Upon these rings the brushes 55 from the line-wires $55^a$, $55^b$, and $55^c$ rest, so as to establish a circuit between the wires $94^a$ and $94^b$ and said line-wires. The condenser 96, as shown in Figs. 1 and 2, is connected in circuit with the line-wires to prevent undue sparking at the current-changer by absorbing the counter electromotive force of the line-wires by the action of the current in being shifted from one line to the other. In Fig. 2 the current in the lines $94^a$ and $94^b$ is alternated at one end, so that there is more or less back pressure, which the condenser 96, as there located, takes up and prevents sparking at the brushes.

The test push-button 97, Fig. 1, is in series with the main-line battery 89 and a secondary relay-coil 111 through the main relay to the contact-brushes coöperating with the current-changer 4. This test-alarm is provided with an independent battery 112 and bell 113 in circuit with a contact-piece 82, coöperating with the armature 82ª of the relay-magnet 111. The object of this is a test to ascertain whether the battery-cells are in working order, as by pressing the button 97 the circuit through the relay 111 is opened, permitting the armature 82ª to make contact through the battery 112 and bell 113. In the present arrangement of circuits it will be observed that the circuit is split, and the battery could continue to weaken until it finally became exhausted without giving the alarm, and up to this time the invention would continue to operate. By the use of the push-button the battery, as well as the working of the system, can always be tested from the protected structure without the necessity of breaking a line elsewhere, and thus causing an alarm to be given. The test-button simply opens the line 110 from the main battery 89.

The substations shown in Fig. 1 are illustrated with and without the fuses or fire-alarms C. If one or more of these fuses are introduced into a fire-protection circuit and become melted, the circuit is opened, which throws the armature 91 of the main relay 116, Fig. 1, making contact with the line 99. This also opens contact to substations by breaking contacts of spring 106, thereby releasing armature of relay 83 at substation, which closes local battery 103 through bell 107. Substantially the same effect would necessarily take place should the substation be broken or tampered with. The armature for the substation apparatus is indicated at 105 and adapted to contact with the point 104 by means of the spring 106 under the conditions just mentioned.

Within both the protected structure and the protected cabinet containing the apparatus suitable resistances, as indicated at M N O, Fig. 2, and P Q R, Fig. 1, are added in series with each other, but so arranged that different amounts are at each end of each line, whereby each line shall always have the same total resistance as another line. For instance, assuming that the resistances just mentioned are extra resistance-coils added to the line-wires and taking line 55ª, we may assume that the resistance of the coil P is seventy-five ohms, while that of M in circuit therewith at the protected structure has a resistance of twenty-five ohms. Likewise taking the line 55ᵇ and assuming the resistance Q to have twenty-five ohms and the next line in the same manner, using any arbitrary division of the various resistances which may be found proper. It is of course understood that the resistances P Q R are located in a proper protected position at a police-station or any other suitable point.

It will be obvious that the details of construction and configuration of the relay herein described may be changed and the relay applied in any desired relation to other electric circuits not herein illustrated without departing from the spirit of the invention as defined by the appended claims.

Having described our invention and set forth its merits, what we claim, and desire to secure by Letters Patent, is—

1. The method of balancing a relay for protecting an electric circuit, consisting in suspending a polarized armature in the field of mutually-repellent magnets, one of which is wound with divisions of said circuit extending in opposite directions upon the core thereof.

2. The method of balancing a relay for protecting an electric circuit which consists in dividing a circuit from a battery and connecting said divisions in reverse directions upon a polarized core and relative to a polarized armature to form the coil of a permanent magnet having a polarized core mutually repellent to the pole of said armature next to said core, presenting a resistance to one division of said circuit and a permanent magnet having a repellent pole disposed at the opposite side of the armature from said circuit-connected magnet.

3. The method of balancing a relay for protecting an electric circuit which consists in dividing a circuit from a battery and connecting said divisions in reverse directions upon a polarized core and relative to a polarized armature to form the coil of a permanent magnet having a polarized core mutually repellent to the pole of said armature next to said core, presenting a resistance to one division of said circuit, shifting the other division of said circuit from one set of lines to another and alternating its polarity in the act of shifting and a permanent magnet having a repellent pole disposed at the opposite side of the armature from said circuit-connected magnet.

4. The method of controlling a balanced relay which consists in dividing a circuit and passing the divisions thereof in opposite directions upon a polarized core to form a magnet, and disposing separate sets of said divided-current magnets with their mutually-repellent poles at opposite sides of the repellent pole of a polarized armature.

In testimony whereof we affix our signatures in presence of two witnesses.

HENRY M. SUTTON.
WALTER L. STEELE.
MICHAEL COERVER.

Witnesses:
W. H. BURKHALTER,
N. L. MOSELEY.